United States Patent
Kwon

(10) Patent No.: US 10,117,284 B2
(45) Date of Patent: *Oct. 30, 2018

(54) METHOD AND APPARATUS FOR TRANSMITTING MEDIA ACCESS CONTROL INFORMATION IN WIRELESS COMMUNICATION SYSTEM SUPPORTING DEVICE TO DEVICE COMMUNICATION

(71) Applicant: Innovative Technology Lab Co., Ltd., Seoul (KR)

(72) Inventor: Ki Bum Kwon, Seongnam (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,386

(22) Filed: Jan. 27, 2017

(65) Prior Publication Data

US 2017/0142768 A1    May 18, 2017

Related U.S. Application Data

(63) Continuation of application No. 14/639,727, filed on Mar. 5, 2015, now Pat. No. 9,596,711.

(30) Foreign Application Priority Data

Mar. 7, 2014 (KR) .................. 10-2014-0027011

(51) Int. Cl.
*H04W 76/00* (2018.01)
*H04L 12/18* (2006.01)
(Continued)

(52) U.S. Cl.
CPC ............. *H04W 76/14* (2018.02); *H04L 12/18* (2013.01); *H04W 72/04* (2013.01)

(58) Field of Classification Search
None
See application file for complete search history.

(56) References Cited

U.S. PATENT DOCUMENTS

| 7,342,877 | B1 | 3/2008 | Ervin | |
|---|---|---|---|---|
| 9,596,711 | B2 * | 3/2017 | Kwon | ................ H04W 76/023 |

(Continued)

FOREIGN PATENT DOCUMENTS

| WO | WO 2013/068788 A1 | 5/2013 |
|---|---|---|
| WO | WO 2013/157906 A1 | 10/2013 |
| WO | WO 2013/191522 A1 | 12/2013 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.0.0, Dec. 2013, pp. 1-57, 3GPP.

(Continued)

*Primary Examiner* — George C Atkins

(57) ABSTRACT

Provided is an apparatus and method for performing a device-to-device communication. User equipment devices may perform a wireless communication through a base station and may perform a device-to-device communication among user equipment devices. Exemplary embodiments provide a method including: receiving, at a target user equipment (UE), MAC PDU including a MAC header and a MAC payload, wherein the MAC header indicates a device-to-device communication, and the MAC payload includes data to be transmitted through the device-to-device communication; identifying, from the MAC header, a source identification field and a target identification field following the source identification field, wherein the source identification field is associated with a source layer-2 identification of a source UE, and the target identification field is associ- (Continued)

ated with a target layer-2 identification of the target UE; and determining whether the MAC payload includes data for the target UE based on a value of the target identification field.

11 Claims, 11 Drawing Sheets

(51) Int. Cl.
*H04W 72/04* (2009.01)
*H04W 76/14* (2018.01)

(56) References Cited

U.S. PATENT DOCUMENTS

| | | |
|---|---|---|
| 2010/0202355 A1 | 8/2010 | Kim |
| 2012/0077510 A1 | 3/2012 | Chen et al. |
| 2013/0029712 A1 | 1/2013 | Shao et al. |
| 2015/0045078 A1 | 2/2015 | Lee |
| 2015/0305070 A1 | 10/2015 | Ahmad |
| 2016/0183276 A1 | 6/2016 | Marinier |
| 2016/0338092 A1* | 11/2016 | Agiwal ............. H04W 72/1289 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overal description Stage 2 (Release 12)," 3GPP TS 36.300 V12.0.0, Dec. 2013 pp. 1-208, 3GPP.

International Search Report for International Patent Application No. PCT/KR2015/002210, dated May 28, 2015.

Written Opinion for International Patent Application No. PCT/KR2015/002210, dated May 28, 2015.

* cited by examiner

R/R/E/LCID sub-header

METHOD AND APPARATUS FOR TRANSMITTING MEDIA ACCESS CONTROL INFORMATION IN WIRELESS COMMUNICATION SYSTEM SUPPORTING DEVICE TO DEVICE COMMUNICATION

CROSS-REFERENCE TO RELATED APPLICATIONS

This application is a continuation of a U.S. patent application Ser. No. 14/639,727, filed on Mar. 5, 2015, which claims priority from and the benefit of Korean Patent Application No. 10-2014-0027011, filed on Mar. 7, 2014, which is hereby incorporated by reference in its entirety.

BACKGROUND

1. Field

Exemplary embodiments relate to a wireless communication system, and particularly, to a method and apparatus for configuring Media Access Control (MAC) information and transmitting and receiving the configured MAC information in a wireless communication system that supports communication between terminals (Device to Device communication).

2. Discussion of the Background

Communication between terminals (Device to Device (D2D) communication) is a communication scheme that has been utilized from the days of analog radio set, which has a long history. However, communication between terminals in a wireless communication system is distinguished from existing communication between terminals.

The communication between terminals in the wireless communication system refers to communication in which terminals utilize transmission/reception technologies of the wireless communication system in the frequency band of the wireless communication system or other bands, and directly exchange user data without using an infrastructure (for example, a base station). This may allow wireless communication in an area outside the limited wireless communication infrastructure, and may reduce loads on the network of the wireless communication system.

However, for the communication between terminals in the wireless communication system, a terminal needs to determine which terminal transmits received data, and is required to determine whether the received data corresponds to data that the terminal should receive. In addition, the terminal needs to identify a logical channel to which each received data belongs. However, the current wireless communication system does not support them.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments provide a method of performing a device-to-device communication among user equipment (UE) devices, the method including: receiving, at a first UE, a first message transmitted from a second UE for a device-to-device communication between the first UE and the second UE, wherein the first message includes a medium access control (MAC) header and a MAC payload, wherein the MAC header includes a first source identification field, a first target identification field, and one or more MAC sub-headers for the device-to-device communication, wherein the first source identification field and the first target identification field are followed by the MAC sub-headers; determining the second UE as a source of the first message by identifying the first source identification field associated with a source layer-2 identification of the second UE; determining whether the first message is transmitted for the first UE by identifying the first target identification field associated with a target layer-2 identification of the first UE; and retrieving a MAC control element from the MAC payload, the MAC control element corresponding to the MAC control element sub-header included in the one or more MAC sub-headers.

Exemplary embodiments provide a method of configuring a medium access control (MAC) message for a device-to-device communication among user equipment (UE) devices, the method including: receiving, at a first UE by a higher layer signaling, a proximity-based services identification; configuring a MAC header for a device-to-device communication between the first UE and a second UE, the MAC header including a first source identification field, a first target identification field, and one or more MAC sub-headers for the device-to-device communication, and the one or more MAC sub-headers including a MAC control element sub-header; configuring a MAC payload including a MAC control element corresponding to the MAC control element sub-header; transmitting, from the first UE to the second UE through a device-to-device communication, a first message including the MAC header and the MAC payload, wherein the first source identification field and the first target identification field are followed by the MAC sub-headers. The first source identification field is configured based on a source layer-2 identification of the first UE, the source layer-2 identification of the first UE being determined based on the received proximity-based services identification. The first target identification field is configured based on a target layer-2 identification of the second UE, the target layer-2 identification of the second UE being determined based on the received proximity-based services identification.

Exemplary embodiments provide a method of performing a device-to-device communication in a wireless communication system, the method including: receiving, at a source user equipment (UE), a proximity-based services identification from a base station by a higher layer signaling; generating, at the source UE, a medium access control (MAC) packet data unit (PDU) based on the received proximity-based services identification; and transmitting the MAC PDU to one or more target UEs through a device-to-device communication, wherein the generation of the MAC PDU includes: configuring a MAC header for the device-to-device communication, the MAC header including a source identification field and a target identification field following the source identification field, and configuring a MAC payload for the device-to-device communication, the MAC payload including a MAC control element and a MAC service data unit. The source identification field is associated with a source layer-2 identification corresponding to the source UE, and the target identification field is associated with a target layer-2 identification corresponding to the one or more target UEs. The MAC control element includes control information for the device-to-device communication, and the MAC service data unit includes data to be transmitted through the device-to-device communication.

Exemplary embodiments provide a method of performing a device-to-device communication in a wireless communication system, the method including: receiving, at a target user equipment (UE), medium access control (MAC) packet data unit (PDU) including a MAC header and a MAC payload, wherein the MAC header indicates a device-to-device communication, and the MAC payload includes data transmitted through the device-to-device communication; identifying, from the MAC header, a source identification field and a target identification field following the source identification field, wherein the source identification field is associated with a source layer-2 identification of a source UE, and the target identification field is associated with a target layer-2 identification of the target UE; and determining whether the MAC payload includes data for the target UE based on a value of the target identification field.

According to exemplary embodiments, control of D2D data flow, multiplexing/demultiplexing, or the like may be supported while communication between terminals is executed and thus, resources may be efficiently managed in Media Access Control (MAC).

DETAILED DESCRIPTION OF THE ILLUSTRATED EMBODIMENTS

Figure 1:
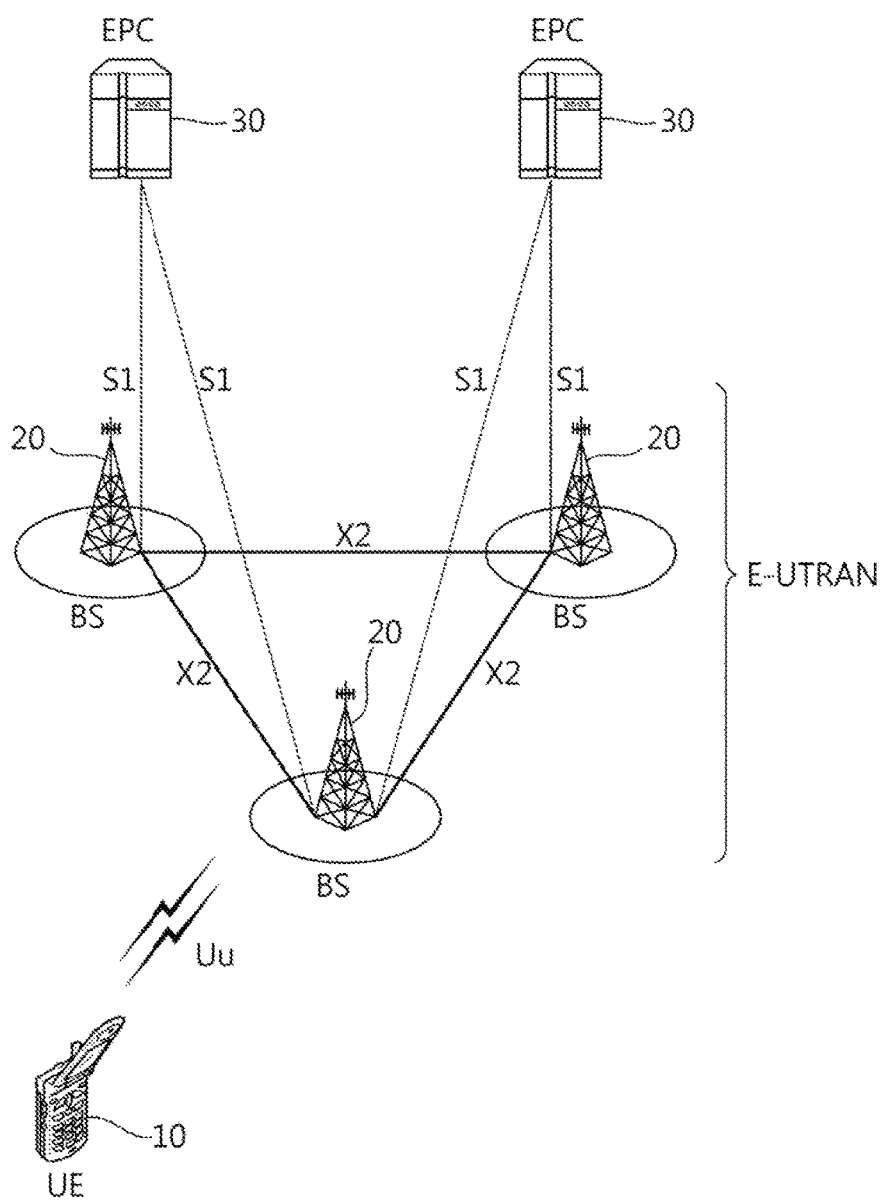
FIG. 1 is a diagram illustrating a network architecture of a wireless communication system according to exemplary embodiments.

Hereinafter, exemplary embodiments will be described with reference to the accompanying drawings. In the following description, the same elements will be designated by the same reference numerals although they are shown in different drawings. Further, in the following description, a detailed description of known functions and configurations incorporated herein will be omitted when it may make the subject matter of exemplary embodiments rather unclear.

In addition, the present specification provides descriptions in association with a wireless communication network, and tasks executed in the wireless communication network may be performed in the process where a system (for example, a base station) that manages the corresponding wireless communication network controls a network and transmits data, or may be performed in a terminal that connects to the corresponding wireless network.

FIG. 1 is a diagram illustrating a network architecture of a wireless communication system according to exemplary embodiments.

FIG. 1 illustrates the network architecture of an Evolved-Universal Mobile Telecommunications System (E-UMTS), which is an example of a wireless communication system. The E-UMTS system may be Evolved-UMTS Terrestrial Radio Access (E-UTRA), Long Term Evolution (LTE), or LTE-advanced (LTE-A). The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), Single Carrier-FDMA (SC-FDMA), OFDM-FDMA, OFDM-TDMA, OFDM-CDMA, and the like.

Referring to FIG. 1, an Evolved-UMTS Terrestrial Radio Access Network (E-UTRAN) includes a base station (hereinafter referred to as an evolved NodeB (eNB) 20) that provides a terminal (hereinafter referred to as User Equipment (UE) 10) with a Control Plane (CP) and a User Plane (UP).

The UE 10 may be a stationary or mobile entity, and may be referred to as a Mobile station (MS), an Advanced MS (AMS), a User Terminal (UT), a Subscriber Station (SS), a wireless device, or the like.

The eNB 20 may generally refer to a station that communicates with the UE 10, and may be referred to as a Base Station (BS), a Base Transceiver System (BTS), an access point, a femto-eNB, a pico-eNB, a Home eNB, a relay, or the like. The eNBs 20 may be physically connected to one another through an optical cable or a Digital Subscriber Line (DSL), or the like, and may exchange signals or messages through an X2 or Xn interface. FIG. 1 exemplifies the case in which eNBs 20 are connected to one another through an X2 interface.

Hereinafter, descriptions associated with a physical connection will be omitted and a logical connection will be described. As illustrated in FIG. 1, the eNB 20 is connected to an Evolved Packet Core (EPC) 30 through an S1 interface. In particular, the eNB 20 is connected to a Mobility Management Entity (MME) through an S1MME interface, and is connected to a Service Gateway (S-GW) through an S1-U interface. The eNB 20 may exchange context information of the UE 10 and information for supporting mobility of the UE 10, with the MME through the S1-MME interface. In addition, the eNB 20 may exchange data to be provided to each UE 10, with an S-GW through the S1-U interface.

Although not illustrated in FIG. 1, the EPC 30 includes an MME, an S-GW, and a Packet data network-Gateway (P-GW). The MME has access information of the UE 10 or information associated with capability of the UE 10, and the information may be used for mobility management of the UE 10. The S-GW is a gateway having an E-UTRAN as an end point, and the P-GW is a gateway having a Packet Data Network (PDN) as an end point.

The E-UTRAN and the EPC 30 together are referred to as an Evolved Packet System (EPS), and a traffic flow from a radio link through which the UE 10 accesses the eNB 20 to a PDN that provides a connection to a service entity, may be operated based on an Internet Protocol (IP).

A radio interface between the UE 10 and the eNB 20 is referred to as a "Uu interface." The layers of a Radio Interface Protocol between the UE 10 and a network are classified into a first layer (L1), a second layer (L2), and a third layer (L3), which are defined by 3rd Generation Partnership Project (3GPP)—affiliated wireless communication system, such as, UMTS, LTE, LTE-Advanced, or the like. A physical layer belongs to the first layer among them, provides information transfer services using a physical channel, and a Radio Resource Control (RRC) layer located in the third layer provides radio resources between the UE 10 and the network by exchanging an RRC message.

Figure 2:
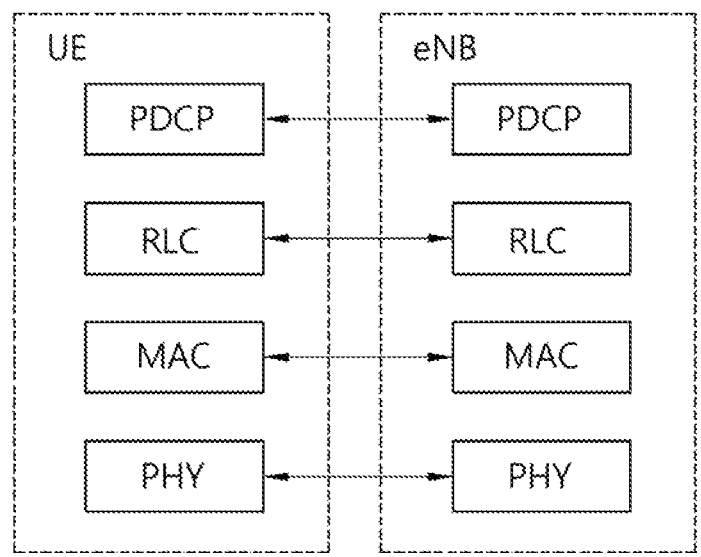
FIG. 2 is a block diagram illustrating a radio protocol architecture associated with a user plane according to exemplary embodiments.
Figure 3:
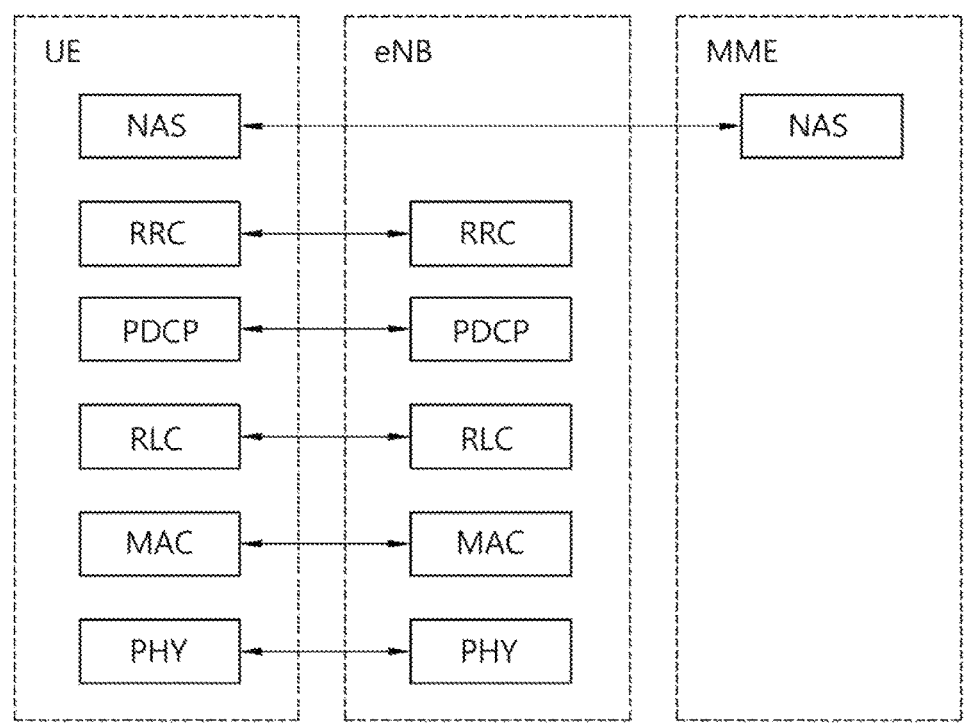
FIG. 3 is a block diagram illustrating a radio protocol architecture associated with a control plane according to exemplary embodiments.

FIG. 2 is a block diagram illustrating a radio protocol architecture associated with a user plane according to exemplary embodiments. FIG. 3 is a block diagram illustrating a radio protocol architecture associated with a control plane according to exemplary embodiments. The user plane indicates a protocol stack for user data transmission, and the control plane indicates a protocol stack for control signal transmission.

Referring to FIGS. 2 and 3, each Physical (PHY) layer of a UE and an eNB provides an information transfer service to a higher layer using a physical channel. The physical layer is connected to a Media Access Control layer which is a higher layer, through a transport channel. Data is transferred through a transport channel between the MAC layer and the physical layer. The transport channel is classified based on a scheme of transmitting data through a radio interface. In addition, data is transferred through a physical channel between different physical layers (that is, between physical layers of a UE and an eNB). The physical channel may be modulated based on an Orthogonal Frequency Division Multiplexing (OFDM) scheme, and uses a space formed of time and frequencies, and a space formed of a plurality of antennas as radio resources.

For example, a Physical Downlink Control CHannel (PDCCH) among physical channels may inform a UE of resource allocation of a Paging CHannel (PCH) and a DownLink Shared CHannel (DL-SCH) and Hybrid Automatic Repeat Request (HARD) information associated with a DL-SCH, and may deliver, to a UE, uplink scheduling grant which reports resource allocation of uplink transmission. A Physical Control Format Indicator CHannel (PC-FICH) informs a UE of the number of OFDM symbols used for PDCCHs, and is transmitted for each subframe. A Physical Hybrid ARQ Indicator CHannel (PHICH) carries a HARQ ACK/NACK signal as a response to uplink transmission. In addition, a Physical Uplink Control CHannel (PUCCH) delivers HARQ ACK/NACK with respect to downlink transmission and uplink control information such as a scheduling request and a Channel Quality Indicator (CQI). A Physical Uplink Shared CHannel (PUSCH) delivers an UpLink Shared CHannel (UL-SCH). The PUSCH may include HARQ ACK/NACK and Channel State Information (CSI) such as a CQI.

The MAC layer may execute mapping between a logical channel and a transport channel, and execute multiplexing or demultiplexing between a transport channel of a MAC Service Data Unit (SDU) that belongs to the logical channel and a transport block provided in a physical channel. The MAC layer provides services to a Radio Link Control (RLC) layer through the logical channel. The logical channel is classified into a control channel for transferring control area information and a traffic channel for transferring user area information. For example, services provided from the MAC layer to a higher layer include data transmission or radio resource allocation.

The functions of the RLC layer include concatenation, segmentation, and reassembly of an RLC SDU. The RLC layer provides three types of operation modes, such as, a Transparent Mode (TM), an Unacknowledged Mode (UM) and an Acknowledged Mode (AM), to secure various Quality of Services (QoS) required by a Radio Bearer (RB).

Generally, the TM is used for setting an initial connection.

The UM is for real time data transmission such as data streaming or a Voice over Internet Protocol (VoIP), which places importance on speed rather than the reliability of data. However, the AM is a mode that places importance on the reliability of data rather than speed, and is appropriate for high capacity data transmission or data transmission which is less sensitive to transmission delay. An eNB determines the mode of an RLC in an RB corresponding to each EPS bearer, based on QoS information of a corresponding EPS bearer that has a connection with a UE, and configures parameters in an RLC to satisfy QoS.

RLC SDUs are provided in various sizes, and for example, may be provided based on a byte unit. RLC Protocol Data Units (PDUs) may be defined only when a transmission opportunity is reported from a lower layer (for example, a MAC layer), and is transferred to a lower layer. The transmission opportunity may be reported together with the total size of RLC PDUs to be transmitted. Alternatively, the transmission opportunity and the total size of RLC PDUs to be transmitted may be separately reported.

The function of a Packet Data Convergence Protocol (PDCP) layer in the user plane includes user data transmission, header compression, and ciphering, and control plane data transmission and ciphering/integrity protection.

Referring to FIG. 3, a RRC layer controls a logical channel, a transport channel, and a physical channel, in association with configuration, reconfiguration, and release of RBs. An RB indicates a logical path provided by a first layer (PHY layer) and a second layer (MAC layer, RLC layer, and PDCP layer), for transferring data between a UE and a network. A process of configuring an RB indicates a process that defines properties of radio protocol layer and a channel for providing a predetermined service, and sets corresponding detailed parameters and an operation method. An RB may be classified into a Signaling RB (SRB) and a Data RB (DRB). The SRB is used as a path for transmitting an RRC message and a Non-Access Stratum (NAS) message in the control plane, and the DRB is used as a path for transmitting user data in the user plane. A Non-Access Stratum (NAS) layer located in the upper portion of the RRC layer executes functions such as session management, mobility management, and the like. When an RRC connection exists between the RRC layer of a UE and the RRC layer of an E-UTRAN, the UE is in an RRC connected state, and otherwise, the UE is in an RRC idle state.

Resources need to be allocated to various paths among mobile communication network entities existing between a UE and an external Internet network, to enable the UE to transmit user data (for example, an IP packet) to the external network or to receive user data from the external network. As described above, a path that is capable of executing data transmission and reception through resources allocated between mobile communication network entities, is referred to as a bearer.

Figure 4:
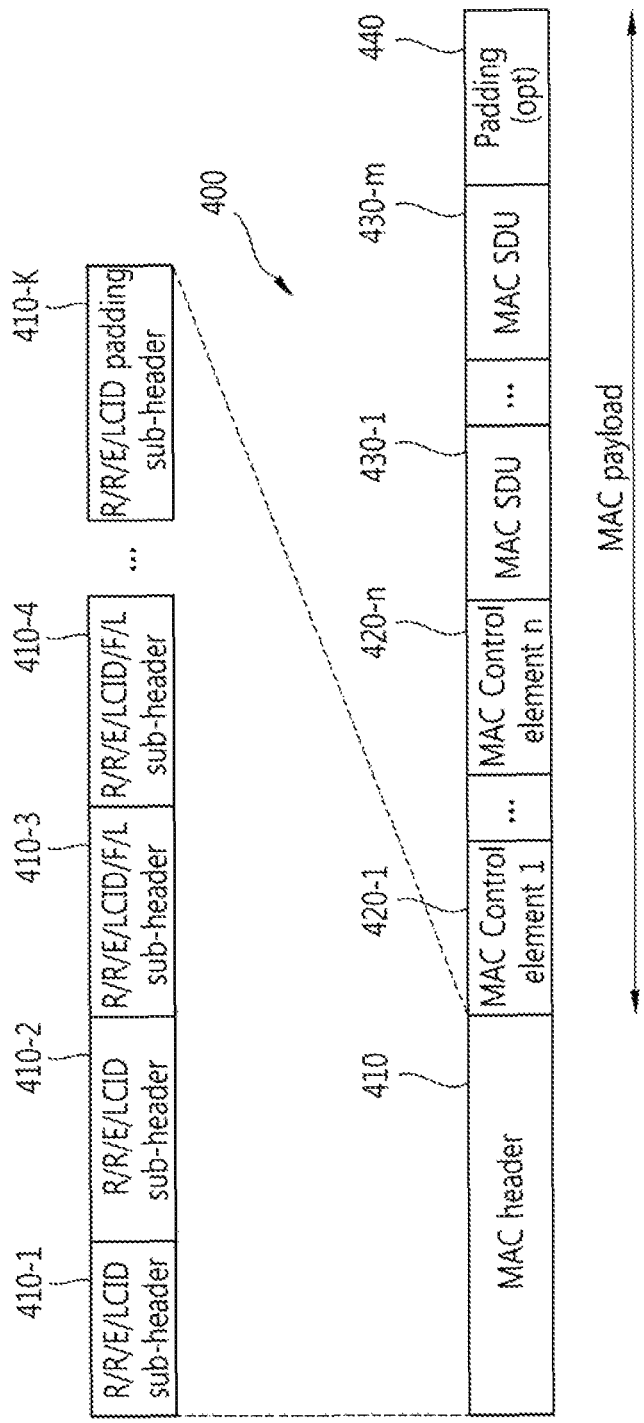
FIG. 4 is a diagram illustrating the architecture of a Media Access Control (MAC) Protocol Data Unit (PDU) in a wireless communication system according to exemplary embodiments.
Figure 5:
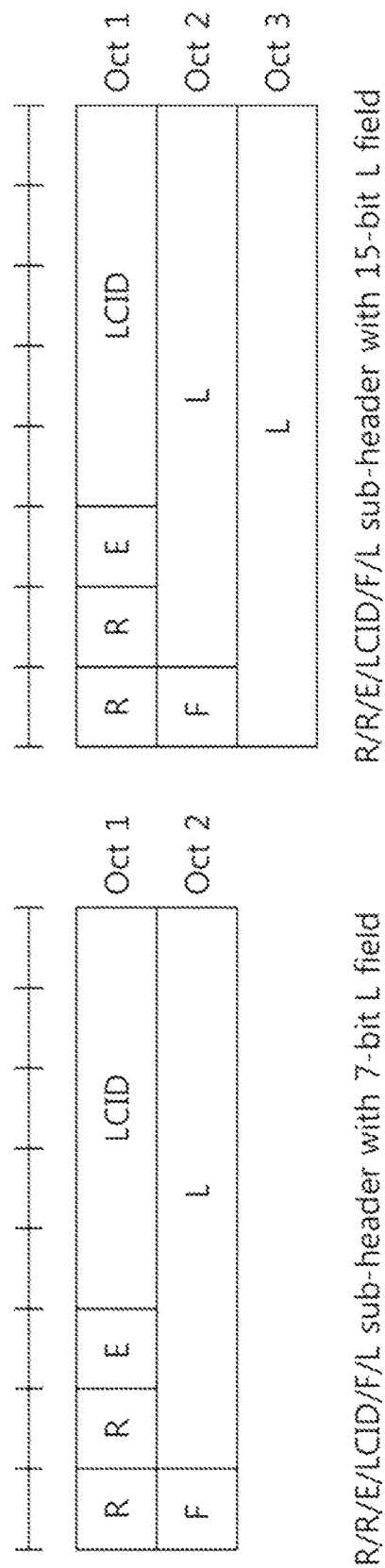
FIG. 5 and FIG. 6 are diagrams illustrating an example of a MAC sub-header in a wireless communication system according to exemplary embodiments.
Figure 6:
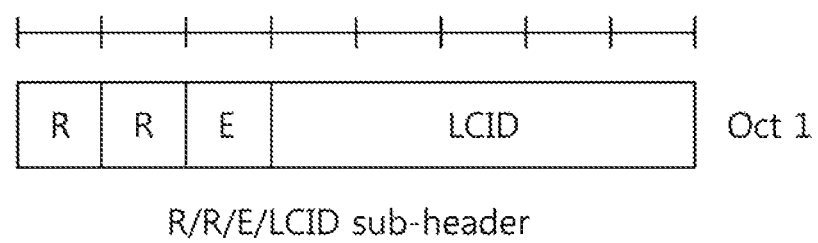

FIG. 4 is a diagram illustrating the architecture of a MAC PDU in a wireless communication system according to exemplary embodiments. FIG. 5 and FIG. 6 are diagrams illustrating an example of a MAC sub-header in a wireless communication system according to exemplary embodiments. The MAC PDU is also referred to as a transport block.

First, referring to FIG. 4, a MAC PDU 400 including a MAC header 410, n MAC control elements 420-1, . . . , and 420-n, m MAC Service Data Units (SDU) 430-1, . . . , and 430-m, and a padding 440, is illustrated. The MAC PDU 400 is formed of the MAC header 410, zero or at least one MAC control element 420-1, . . . , and 425-n, zero or at least one MAC SDU 430-1, . . . , and 430-m, and the padding 440. The size of the MAC header 410 and the size of the MAC SDU 430-1, . . . , and 430-m may vary.

The MAC header 410 includes at least one sub-header 410-1, 410-2, 410-3, 410-4, . . . , and 410-k, and each sub-header 410-1, 410-2, 410-3, 410-4, . . . , and 410-k corresponds to a MAC control element 420-1, . . . , and 420-n, a MAC SDU 430-1, . . . , and 430-m, or a padding 440. The sequence of the sub-header 410-1, 410-2, 410-3, 410-4, . . . , and 410-k is arranged to be identical to the sequence of MAC control element 420-1, . . . , and 420-n, MAC SDU 430-1, . . . , and 430-m, or padding 440, which the sub-header corresponds to in the MAC PDU 400.

Each sub-header 410-1, 410-2, 410-3, 410-4, . . . , and 410-k may include 6 fields, that is, R, R, E, LCD, F, and L fields, or may include 4 fields, that is, R, R, E, and LCID fields. A sub-header including 4 fields is a sub-header corresponding to the MAC control element 420-1, . . . , and 420-n or the padding 440, and a sub-header including 6 fields is a sub-header corresponding to the MAC SDU 430-1, . . . , and 430-m.

The MAC control element 420-1, . . . , and 420-n is a control message generated by a MAC layer, and is located before the MAC SDU 430-1, . . . , and 430m. The MAC SDU 430-1, . . . , and 430-m corresponds to an RLC PDU that is transferred from a Radio Link Control (RLC) layer. The padding 440 is a predetermined number of bits added to maintain the size of the MAC PDU 400, and may always be added to the end of the MAC PDU 400 except for the case that requires a padding of 1 byte or 2 bytes. A UE disregards the value of the padding 440, no matter what the value is. The MAC control element 420-1, . . . , and 420-n, the MAC SDU 430-1, . . . , and 430-m, and the padding 440 together are referred to as a MAC payload.

FIG. 5 illustrates the architecture of the MAC sub-header including 6 fields (R, R, E, LCD, F, and L). FIG. 6 illustrates the architecture of the MAC sub-header including 4 fields (R, R, E, and LCD). Hereinafter, the fields included in the MAC sub-header will be described in detail.

A Logical Channel ID (LCD) field is to identify the logical channel of a corresponding MAC SDU, or to identify the type of a corresponding MAC control element or padding, which has a length (size) of 5 bits. The LCID field is included in a single MAC SDU, a single MAC control element, or a padding included in a MAC PDU. For example, the LCD field for a downlink is listed as shown in Table 1, and the LCD field for an uplink is listed as shown in Table 2.

TABLE 1

| Index | LCID values |
| --- | --- |
| 00000 | CCCH |
| 00001-01010 | Identity of the logical channel |
| 01011-11010 | Reserved |
| 11011 | activation/deactivation |
| 11100 | UE Contention Resolution Identity |
| 11101 | Timing Advance Command |
| 11110 | DRX command |
| 11111 | Padding |

TABLE 2

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

A Length (L) field is a field that identifies the length of a corresponding MAC SDU or identifies the length of a variable-sized MAC control element, and the length of the L field may be indicated by a Format (F) field. FIG. 5 illustrates a sub-header when the L field has a length of 7 bits and a sub-header when the L field has a length of 15 bits.

An F field is a field to identify the length of an L field, and may have a length of 1 bit. When the length of a MAC SDU or a varied-sized MAC control element is less than 128 bytes, the value of the F field may be set to "0". For the rest cases, the value of the F field is set to "1".

An Extension (E) field is a flag to identify whether other fields exist in a MAC header. When the value is set to "1", it indicates that at least another set of R/R/E/LCID fields exists. When the value is set to "0", it indicates that a MAC SDU, a MAC control element, or a padding begins from a subsequent byte.

A Reserved (R) field is a reserved field, which is set to "0".

For communication between UEs (Device to Device communication, hereinafter referred to as D2D), a UE that receives the MAC PDU needs to determine a UE from which the MAC PDU is transmitted. In addition, the UE that receives the MAC PDU needs to determine whether the received MAC PDU corresponds to data that the UE should receive, so as to minimize operations of an application processor or the like for data processing in the UE. In addition, the UE that receives the MAC PDU needs to determine a logical channel to which each MAC SDU of the received MAC PDU belongs. Therefore, exemplary embodiments provide a MAC PDU having the following architecture for D2D.

Figure 7:
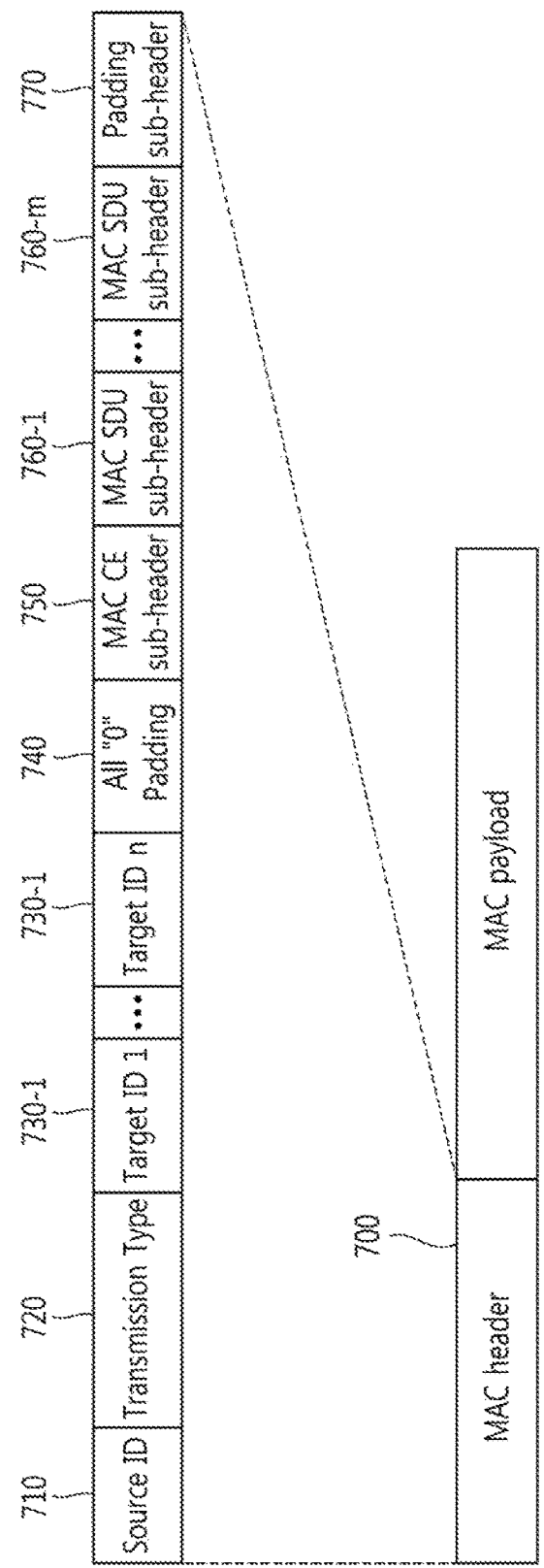
FIG. 7 is a diagram illustrating the architecture of a MAC PDU for communication between terminals, according to exemplary embodiments.

FIG. 7 is a diagram illustrating the architecture of a MAC PDU for D2D, according to exemplary embodiments.

Referring to FIG. 7, a MAC header 700 of a MAC PDU may include a source ID field 710, a transmission type field 720, at least one target ID field 730-1, . . . , and 730-n, a padding field 740, a sub-header associated with a MAC control element 750, a sub-header associated with at least one MAC SDU 760-1, . . . , and 760-m, and a sub-header 770 associated with a padding included in a MAC payload.

The source ID field 710 includes a second layer address ID (a source L2 address ID, hereinafter referred to as a source ID) of a source UE (a UE that transmits D2D data), and is included in the first part of the MAC header 700, as shown in FIG. 7. The source ID field 710 may have a fixed length of 8 bits, 16 bits, or 32 bits. The source ID may be extracted from a Proximity-based Services (ProSe) ID or a ProSe application ID. To this end, the source UE receives configuration information (for example, key value or mapping information) used for extracting a source ID from the ProSe ID or ProSe application ID, from an eNB through a Radio Resource Control (RRC) message, or may receive the same from a Mobility Management Entity (MME) through a Non-Access Stratum (NAS) layer. The configuration information may be stored in a Universal Subscriber Identity Module (USIM) in the UE, to cope with the situation in which the UE is out of the coverage. A target UE determines a UE from which a corresponding MAC PDU is transmitted, based on a source ID included in the source ID field 710.

The transmission type field 720 includes information associated with whether a source UE broadcasts, multicasts, or unicasts a MAC PDU, that is, information associated with a transmission type for a MAC PDU. The transmission type field 720 may have, for example, a length of 2 bits or a length of 8 bits.

The target ID field 730-1, . . . , and 730-n includes a second layer address ID (destination L2 address ID, hereinafter referred to as a target ID) of a destination (a UE or group (for the case of multicasting) that receives D2D data), and may be included next to the transmission type field 720. The target ID field 730-1, . . . , and 730-n may have a fixed length of 8 bits, 16 bits, or 32 bits, and when a group ID needs to be included in the target ID field, the target ID field including the group ID may be expressed by a length of 1 to 8 bits. The target ID field 730-1, . . . , and 730-n may be included in, for example, the MAC header 700 in the case where a MAC PDU is multicasted or unicasted, as shown in FIG. 7. When the MAC PDU is broadcasted, the target ID field 730-1, . . . , and 730-n is not included in the MAC header 700, or information included in the target ID field 730-1, . . . , and 730-n may be disregarded.

As illustrated in FIG. 7, when a plurality of target ID fields 730-1, . . . , and 730-n exists, the padding field 740 having a length of 8 bits or 16 bits, which all are filled with "0", may be located next to the last target ID field 730-n, to indicate a point where the plurality of target ID fields 730-1, . . . , and 730-n end. A target ID may be generated also based on the ProSe ID, and a target UE may determine whether a received MAC PDU corresponds to data that the corresponding UE should receive, based on the target ID.

As another embodiment, the transmission type field 720 may include information associated with the number of target ID fields 730-1, . . . , and 730-n or the length of the target ID fields, together with the information associated with a transmission type for a MAC PDU. A field indicating the information associated with the number of target ID fields or the length may have a length of 2 to 6 bits. In this instance, the UE that receives the corresponding MAC PDU determines a point where the target ID fields 730-1, . . . , and 730-n end, based on the information associated with the number of target ID fields or the length of the target ID fields, included in the transmission type field 720, and thus, the padding field 740 may not be included in the MAC header 700 of the corresponding MAC PDU.

As another embodiment, the transmission type field 720 may include only the information associated with the number of target ID fields 730-1, . . . , and 730-n or the length of the target ID fields 730-1, . . . , and 730-n. In this instance, the target UE may determine a transmission type of a corresponding MAC PDU from among broadcasting, multicasting, and unicasting, based on the transmission type field 720. In this case, the padding field 740 may not be included in the MAC header 700. For example, when a transmission type field value converted into an integer is '0' or the largest value (for example, FFFF, which is 16 bits) of the transmission type field value, this may indicate that the transmission type corresponds to broadcasting. When the value is less than or equal to a predetermined value (for example, 3), the target ID field indicates that the transmission type corresponds to multicasting, and it is recognized that the target ID field includes a group ID. Therefore, it is recognized that the length of each target ID field corresponds to a length when a group ID is included. When the value is greater than the predetermined value and less than the largest value of the transmission type field, this indicates that the transmission type corresponds to unicasting, and it is recognized that the target ID includes a target ID. Therefore, it is recognized that the length of each target ID field corresponds to a length when a target ID is included. When the transmission type field 720 indicates broadcasting, the target ID field 730-1, . . . , and 730-n may not be included in the MAC header 700 or information included in the target ID field 730-1, . . . , and 730-n may be disregarded.

The sub-header 750 associated with a MAC control element is located next to the padding field 740 when the MAC control element exists in a corresponding MAC PDU. The sub-header 750 associated with a MAC control element may be located next to the source ID field 710 when the transmission type field 720 and the target ID fields 730-1, . . . , and 730-n do not exist as the corresponding MAC PDU is broadcasted. In addition, the sub-header 750 associated with a MAC control element may be located next to the last target ID field 730-n when the padding field 740 is not included in the MAC header 700 as information associated with the number of target ID fields 730-1, . . . , and 730-n or the length of the target ID fields 730-1, . . . , and 730-n is not included in the transmission type field 720.

Figure 8:
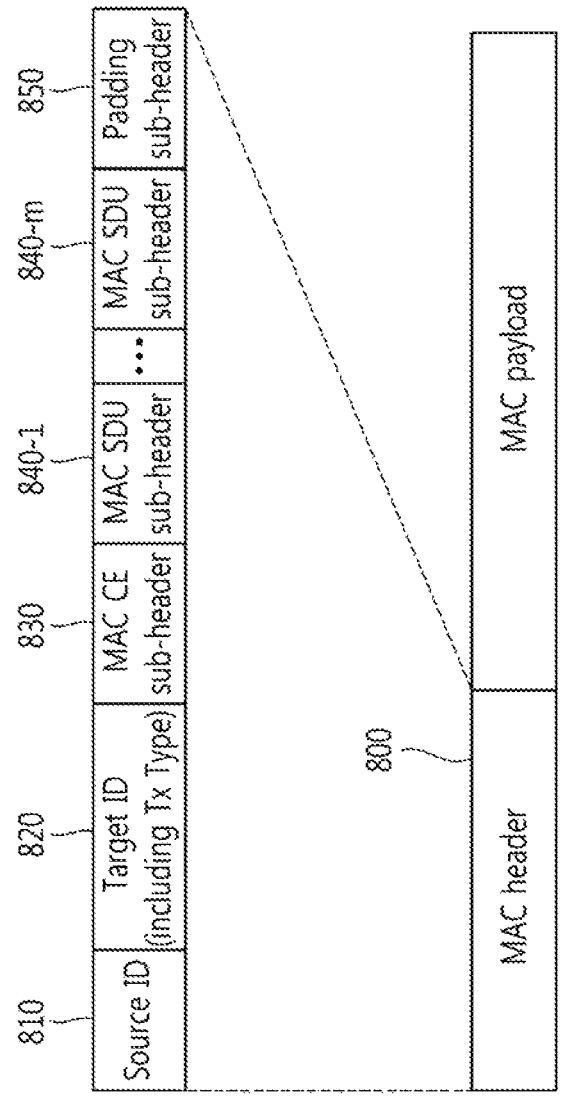
FIG. 8 is a diagram illustrating the architecture of a MAC PDU for communication between terminals, according to exemplary embodiments.

The sub-header 750 associated with a MAC control element may include, for example, four fields (R, R, E, and LCID) as illustrated in FIG. 6, and the value of an LCID field included in the MAC control element may be determined as a unique value which is different from the value of an LCID field associated with a MAC SDU including user data. Here, the LCID of the MAC control element for D2D may be distinguished from the LCID of the wireless communication system. To this end, a MAC layer for processing D2D data and a MAC layer for processing data of the wireless communication system may be separated for a UE, and thus, the logical channel allocation range of 3 to 10 may be identical between them. Although FIG. 8 illustrates the sub-header 750 associated with a single MAC control element, the MAC header 700 may include sub-headers associated with a plurality of MAC control elements when the plurality of MAC control elements exists in a MAC PDU.

The configurations of the sub-header 750 associated with a MAC control element, sub-header 760-1, . . . , and 760-m associated with a MAC SDU, and the sub-header 770 of a padding are identical to the configurations of the sub-header of a MAC control element, the sub-header of a MAC SDU, and the sub-header of a padding included in a MAC PDU of the existing wireless communication system, respectively. Here, the value of an LCID field included in the sub-header 760-1, . . . , and 760-m associated with the MAC SDU for D2D may be used interchangeably with the value of an LCID field included in the sub-header associated with the MAC SDU of the wireless communication system. That is, the LC values of D2D may be allocated in the same range as that of the LC value of the wireless communication system.

Alternatively, the value of the LCID field included in the sub-header 760-1, . . . , and 760-m associated with the MAC SDU for D2D may be used differently from the value of the LCID field included in the sub-header associated with the MAC SDU of the wireless communication system. That is, the LC values of D2D may be allocated in the different ranges from that of the LC values of the wireless communication system.

The MAC control element included in a payload may include a Timing Advance (TA) command of the existing wireless communication system, to provide a TA value for D2D. In addition, to reduce power consumption of a UE during D2D, a Discontinuous Reception (DRX) command may be used, which is defined in a section (time section configured for D2D) where a D2D resource pool is defined.

FIG. 8 is a diagram illustrating the architecture of a MAC PDU for D2D, according to exemplary embodiments.

Referring to FIG. 8, a MAC header 800 of a MAC PDU may include a source ID field 810, a target ID field, a sub-header 830 associated with a MAC control element, a sub-header 840-1, . . . , and 840-m associated with at least one MAC SDU, and a sub-header 850 associated with a padding included in a MAC payload.

The source ID field 810 includes a second layer address ID (source ID) of a source UE, and may be included in the first part of the MAC header 700, as illustrated in FIG. 8. The source ID field 810 may have a fixed length of 8 bits, 16 bits, or 32 bits. The source ID may be extracted from a Proximity-based Services (ProSe) ID or a ProSe application ID. To this end, the source UE receives configuration information (for example, key value or mapping information) used for extracting a source ID from the ProSe ID or ProSe application ID, from an eNB through a Radio Resource Control (RRC) message, or may receive the same from a Mobility Management Entity (MME) through a Non-Access Stratum (NAS) layer. The configuration information may be stored in a Universal Subscriber Identity Module (USIM) in the UE, to cope with the situation in which the UE is out of the coverage. A target UE determines a UE from which a corresponding MAC PDU is transmitted, based on a source ID included in the source ID field 810.

The target ID field 820 includes a second layer address ID (target ID) of a target UE, and may be located next to the source ID field 810.

The target ID field 820 may indicate a transmission type used for a MAC PDU from among broadcasting, multicasting, and unicasting. To this end, a target ID value may be classified based on three ranges. For example, when the target ID value converted into an integer is '0' or the highest value (for example, FFFF), this indicates broadcasting. When the target ID value is less than or equal to a predetermined value (for example, 255), this indicates multicasting. When the target ID value is greater than the predetermined value and less than the highest value of the target ID value, this indicates unicasting. Here, the source ID and the target ID may be extracted from a ProSe ID, and may be provided to a UE from a base station through an RRC message.

The sub-header 830 associated with a MAC control element may be located next to the target ID field 720 when the MAC control element exists in a corresponding MAC PDU. The sub-header 830 associated with a MAC control element, for example, may include four fields (R, R, E, and LCD) as illustrated in FIG. 6, and the value of an LCID field included in the MAC control element may be determined as a unique value which is different from the value of an LCID field associated with a MAC SDU including user data. Here, the LCID of the MAC control element for D2D may be distinguished from the LCID of the wireless communication system.

The configurations of the sub-header 830 associated with a MAC control element, the sub-header 840-1, . . . , and 840-m associated with a MAC SDU, and the sub-header 850 of the padding are identical to the configurations of the sub-header of a MAC control element, the sub-header of a MAC SDU, and the sub-header of a padding included in a MAC PDU of the existing wireless communication system, respectively. Here, the value of an LCID field included in the sub-header 840-1, . . . , and 840-m associated with the MAC SDU for D2D may be used interchangeably with the value of an LCID field included in the sub-header associated with the MAC SDU of the wireless communication system. That is, the LC values of D2D may be allocated in the same range as that of the LC values of the wireless communication system.

Additionally, the MAC control element is a control message generated by a MAC layer, and is located before the MAC SDU (430-1, . . . , and 430-m as illustrated in FIG. 4). The MAC SDU corresponds to an RLC PDU that is transferred from a Radio Link Control (RLC) layer. The padding is a predetermined number of bits added to maintain the size of the MAC PDU, and may always be added to the end of the MAC PDU except for the case that requires a padding of 1 byte or 2 bytes. A UE disregards the value of the padding, no matter what the value is. As shown the MAC control element 420-1, . . . , and 420-n, the MAC SDU 430-1, . . . , and 430-m, and the padding 440 together are referred to as a MAC payload.

The order of fields included in the MAC PDU illustrated in FIGS. 7 and 8 is an example and, according to exemplary embodiments, fields may be included in a MAC PDU in a different order. In addition, the names of the fields included in the MAC PDU illustrated in FIGS. 7 and 8 are merely examples and may be replaced with other names having the equal or similar function and definition.

Figure 9:
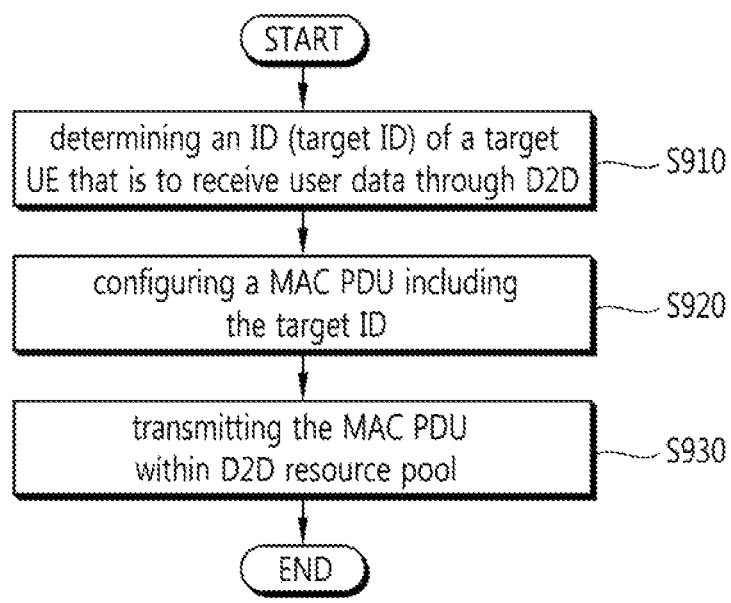
FIG. 9 is a flowchart illustrating a method of transmitting a MAC PDU according to exemplary embodiments.

FIG. 9 is a flowchart illustrating a method of transmitting a MAC PDU according to exemplary embodiments.

Referring to FIG. 9, a source UE determines an ID (target ID) of a target UE that is to receive user data through D2D, in operation S910. The source UE configures a MAC PDU including the target ID in operation S920, and transmits the same to D2D resource pool, in operation S930. Here, the header of the MAC PDU may include a source ID field that includes the ID (source ID) of the UE that transmits the user data through D2D, and a target ID field that includes the ID of the target UE. The source ID and/or target ID may be extracted from a ProSe ID. For example, a UE may receive an RRC message including configuration information used for extracting an ID of the corresponding UE from the ProSeID, or may receive the configuration information from a network through a NAS layer. The configuration information may be stored in the USIM of the corresponding UE.

The source UE may transmit the MAC PDU to a target UE through broadcasting, multicasting, or unicasting, and the header of the MAC PDU may include a transmission type field indicating a transmission type used for the MAC PDU from among broadcasting, multicasting, and unicasting, as illustrated in FIG. 7. The source UE may not include the target ID field in the MAC PDU when the MAC PDU is broadcasted.

When a plurality of target ID fields exists in the header of the MAC PDU as illustrated in FIG. 8, the header of the MAC PDU may include a padding field indicating a point where the target ID fields end. The padding field having a length of 8 bits or 16 bits, which all are filled with "0", may be located next to the last target ID field. However, when information associated with the number of target ID fields or the length of the target ID fields is included in the transmission type field, the target UE may be aware of the point where the target ID fields end based on the information associated with the number of target ID fields or the length of the target ID fields, and thus, the padding field may not be included in the MAC header.

When the value of the target ID field is converted into an integer as illustrated in FIG. 8, the target ID field may indicate a transmission type for the MAC PDU from among broadcasting, multicasting, and unicasting. In this instance, the transmission type field may not be included in the MAC header.

Figure 10:
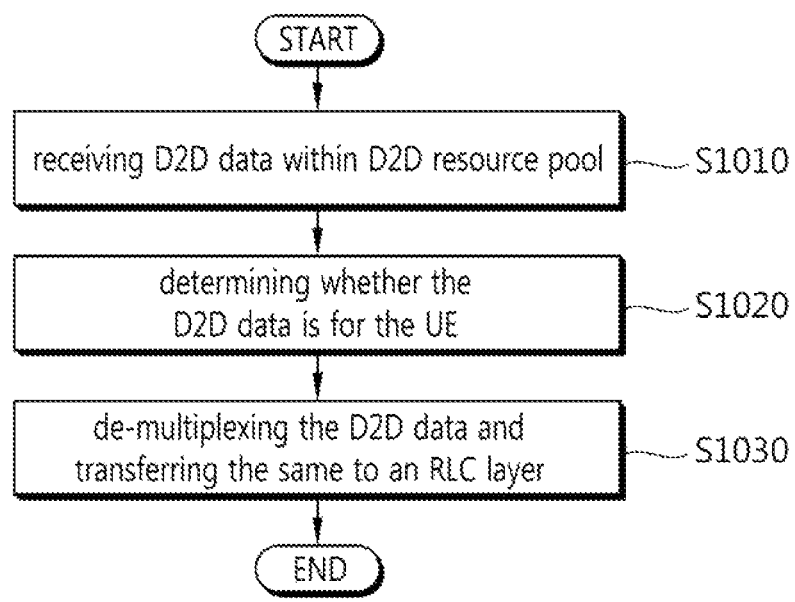
FIG. 10 is a flowchart illustrating a method of receiving a MAC PDU according to exemplary embodiments.

FIG. 10 is a flowchart illustrating a method of receiving a MAC PDU according to exemplary embodiments.

Referring to FIG. 10, when a target UE receives D2D data of a D2D resource pool in operation S1010, the target UE checks a target ID field included in the MAC header of a received MAC PDU so as to determine whether the corresponding D2D data is for the corresponding UE, in operation S1020. When it is determined that the corresponding D2D data is D2D data transmitted to the UE itself, the MAC layer of the target UE de-multiplexes the corresponding D2D data and transfers the same to an RLC layer in operation S1030. In addition, the target UE checks a source ID field included in the MAC header and determines a UE from which the corresponding D2D data is received, and determines a transmission type of the corresponding D2D data, based on the transmission type field or the target ID field included in the MAC header.

Figure 11:
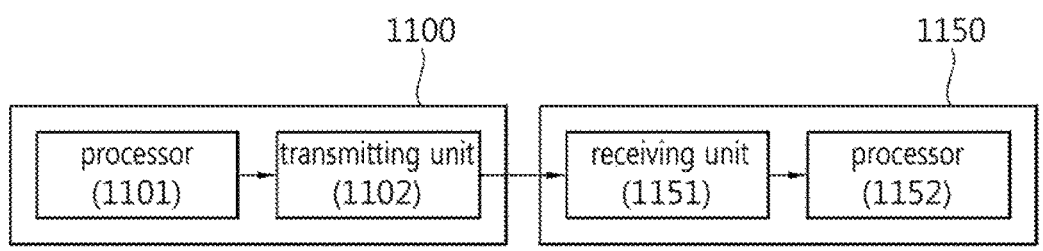
FIG. 11 is a block diagram illustrating a terminal that transmits a MAC PDU and a terminal that receives the MAC PDU, according to exemplary embodiments.

FIG. 11 is a block diagram illustrating a UE that transmits a MAC PDU and a UE that receives the MAC PDU, according to exemplary embodiments.

Referring to FIG. 11, a source UE 1100 includes a processor and a transmitting unit 1102, and a target UE 1150 includes a receiving unit 1151 and a processor 1152. A transceiver may include a transmitting unit and a receiving unit according to exemplary embodiments. Further, a transmitter and a receiver may be configured separately according to exemplary embodiments.

The processor 1101 of the source UE 1100 determines the ID (target ID) of the target UE 1150 that is to receive D2D data, so as to configure a MAC PDU including the target ID. In this instance, the header of the MAC PDU may include a source ID field that includes the ID (source ID) of the source UE 1100, and a target ID field that includes the ID of the target UE 1150. The processor 1101 of the source UE 1100 may extract the source ID and/or target ID from the ProSe ID. To this end, the processor 1101 receives an RRC message including configuration information used for extracting the ID of a corresponding UE from the ProSe ID, and receives the configuration information from a network through an NAS layer. The processor 1101 of the source UE 1100 stores the configuration information in the USIM chip of the source UE 1100.

The processor 1101 of the source UE 1100 may transmit the configured MAC PDU to the target UE 1150 through broadcasting, multicasting, or unicasting, and the header of the MAC PDU may include a transmission type field indicating a transmission type for the MAC PDU from among broadcasting, multicasting, and unicasting, as illustrated in FIG. 7. The processor 1101 of the source UE 1100 may not include the target ID field in the MAC PDU when the MAC PDU is broadcasted.

When D2D data is transmitted to a plurality of target UEs, that is, when a plurality of target ID fields exists in the header of the MAC PDU, as illustrated in FIG. 8, the processor 1101 of the source UE 1100 may include, in the header of the MAC PDU, a padding field indicating a point where the target ID fields end. The padding field having a length of 8 bits or 16 bits, which all are filled with "0", may be located next to the last target ID field. In addition, the processor 1101 of the source UE 1100 includes information associated with the number of target ID fields or the length of the target ID fields in the transmission type field, and the target UE may be aware of a point where the target ID fields end based on the information associated with the number of target ID fields or the length of the target ID fields, and thus, the padding field may not be included in the MAC header.

When the value of the target ID field is converted into an integer as illustrated in FIG. 8, the target ID field may indicate a transmission type for the MAC PDU from among broadcasting, multicasting, and unicasting. In this instance, the processor 1101 of the source UE 1100 may not include the transmission type field in the MAC header.

The transmitting unit 1102 transmits the MAC PDU configured in the processor 1101 to the target UE 1150.

When the receiving unit 1151 of the target UE 1150 receives the MAC PDU from the source UE 1100, the receiving unit 1151 transfers the same to the processor 1152 of the target UE 1150.

The processor 1152 of the target UE 1150 determines the target ID field included in the MAC header of the received MAC PDU, and determines whether the corresponding D2D data is data that is transmitted to the target UE 1150. The processor 1152 of the target UE 1150 de-multiplexes the corresponding D2D data when it is determined that the D2D data corresponds to D2D data that is transmitted to the target UE 1150, and disregards the corresponding D2D data when it is determined that the D2D data is not D2D data that is transmitted to the target UE 150.

The processor 1152 of the target UE 1150 checks the source ID field included in the MAC header of the received MAC PDU and determines that the corresponding D2D data is transmitted from the source UE 1100, and determines the transmission type of the corresponding D2D data based on the transmission type field or the target ID field included in the MAC header.

According to exemplary embodiments, a UE may directly communicate with another UE by enabling a D2D communication. If at least two UEs are capable of performing a D2D communication, the at least two UEs may receive requisite information from a base station for the D2D communication. For example, when a source UE and a target UE are capable of a D2D communication and maintaining an RRC connection with a base station, respectively, the source UE and the target UE may receive a proximity-based services identification from the connected base station, respectively. The proximity-based services identification may be configured uniquely for a UE or may be configured differently between the source UE and the target UE for a certain scenario.

The source UE may attempt to perform a D2D communication with the target UE by transmitting a D2D signal to the target UE without conveying the D2D signal to the target UE through a base station. The D2D signal may be directly transmitted from the source UE to the target UE when the target UE is located in proximity to the source UE. If the D2D signal reaches the target UE without significant interference and the target UE is capable of decoding the D2D signal, it may be determined that the target UE is located in proximity to the source UE.

The source UE may generate a message for the D2D communication with the target UE. The message may include a MAC message that utilizes various protocol structures configured for a mobile communication through a base station, such as an Evolved NodeB supporting various air interface standards (e.g., LTE, LTE-A, and the like). For example, the MAC message may include various sub-headers, e.g., MAC CE sub-header, MAC SDU sub-header, and padding sub-header, and corresponding data parts, e.g., MAC CE, MAC SDU, and padding in MAC payload. However, for the D2D communication, the source UE and the target UE may generate or detect a source identification and a target identification through identification fields configured in a MAC message and/or other protocols.

If a D2D communication is enabled in a target UE, the target UE may receive a first message from a source UE. The first message may be configured for a D2D communication by the source UE and may include MAC header and a MAC payload. The MAC header may include a source identification field and a target identification field. The source identification field and the target identification field may be followed by one or more sub-headers for a D2D communication. The sub-headers may have a protocol structure conforming to or similar to MAC message sub-headers which the source UE or the target UE utilize in a communication with a base station. Corresponding data formats included in MAC payload of the D2D communication may also have a protocol structure conforming to or similar to a MAC payload which the source UE or the target UE utilize in a communication with a base station.

The target UE may retrieve information included in the source identification field of the received MAC message. The information included in the source identification field may be associated with a source layer-2 identification of the source UE. The source layer-2 identification of the source UE may be generated by the source UE based on the proximity-based services identification provided to the source UE by a higher layer signaling. The target UE may also retrieve information included in the target identification field of the received MAC message. The information included in the target identification field may be associated with a target layer-2 identification. The source UE may obtain the target layer-2 identification based on the proximity-based services identification, and may configure the target identification field in the MAC header so that the target UE can distinguish the MAC message from other MAC messages targeted for other UEs. The target UE may also read one or more sub-headers, e.g., MAC CE sub-header and MAC SDU sub-header, and retrieve corresponding data, e.g., MAC CE and MAC SDU, from MAC payload of the MAC message.

A UE which receives a D2D signal, e.g, the target UE, may transmit a D2D signal to one or more new target UEs, e.g., the source UE and/or another UE, by configuring a MAC message. The MAC message generated by the UE which received the D2D signal may include a source identification field associated with a source layer-2 identification of the UE which received the D2D signal. The source layer-2 identification of the UE which received the D2D signal may be obtained based on a proximity-based services identification configured for the UE which received the D2D signal. The UE which received the D2D signal may obtain a target layer-2 identification based on the proximity-based services identification configured for the UE which received the D2D signal, and configures a target identification field based on the obtained target layer-2 identification. This target layer-2 identification identifies one or more other UEs, and the one or more UEs may distinguish this MAC message from other messages by retrieving information included in the target identification field of the MAC message.

The source layer-2 identification and the target layer-2 identification may have a length corresponding to a multiple of 8 bits. Thus, one or more octets may be configured for a source identification field and a target identification field, respectively, so that the source identification field and the target identification field include a value associated with a source layer-2 identification and a target layer-2 identification, respectively. The source identification field may have a maximum length of 32 bits, and the target identification field may have a maximum length of 16 bits. However, exemplary embodiments are not limited as such.

According to different values of the target layer-2 identification, different target UE(s) may be specified. Further, according to different values of the target layer-2 identification, a broadcasting, a multicasting, or a unicasting may be determined.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

What is claimed is:

1. A first user equipment (UE) to perform a device-to-device communication with a second UE, the first UE comprising:
   a receiver to receive a first message transmitted from the second UE for a device-to-device communication between the first UE and the second UE, wherein the first message comprises a medium access control (MAC) header and a MAC payload, wherein the MAC header comprises a first source identification field, a first target identification field, and one or more MAC sub-headers for the device-to-device communication, wherein the first source identification field and the first target identification field are followed by the one or more MAC sub-headers; and
   a processor to determine the second UE as a source of the first message by identifying the first source identification field associated with a source layer-2 identification of the second UE, to determine whether the first message is transmitted for the first UE by identifying the first target identification field associated with a target layer-2 identification of the first UE, and to retrieve a MAC control element from the MAC payload, the MAC control element corresponding to a MAC control element sub-header included in the one or more MAC sub-headers,
   wherein at least one of the target layer-2 identification of the first UE and the source layer-2 identification of the second UE is determined from a proximity-based services identification configured for the second UE by a higher layer signaling for a device-to-device communication,
   wherein the first target identification field has a length of 16 bits,
   wherein the first target identification field has a value of zero when a transmission type used for a MAC Packet Data Unit (PDU) is broadcasting, and
   wherein the first target identification field has a non-zero 16-bit value when a transmission type used for a MAC PDU is multicasting or unicasting.

2. The first UE of claim 1, further comprising:
   a transmitter to transmit, from the first UE to the second UE, a second message, wherein the second message comprises a MAC header comprising a second source identification field, a second target identification field, and one or more MAC sub-headers for a device-to-device communication, wherein the second source identification field is associated with a source layer-2 identification of the first UE, and the second target identification field is associated with a target layer-2 identification of the second UE.

3. The first UE of claim 2, wherein at least one of the target layer-2 identification of the second UE and the source layer-2 identification of the first UE is determined from a proximity-based services identification configured for the first UE by a higher layer signaling for a device-to-device communication.

4. The first UE of claim 1, wherein a length of the source layer-2 identification of the second UE corresponds to a multiple of 8 bits that is longer than 8 bits.

5. A first user equipment (UE) to configure a medium access control (MAC) message for a device-to-device communication with a second UE, the first UE comprising:
   a receiver to receive, by a higher layer signaling, proximity-based services identifications;
   configuring a MAC header for a device-to-device communication between the first UE and the second UE, the MAC header comprising a first source identification field, a first target identification field, and one or more MAC sub-headers for the device-to-device communication, and the one or more MAC sub-headers comprising a MAC control element sub-header;
   a processor to configure a MAC payload comprising a MAC control element corresponding to the MAC control element sub-header; and
   a transmitter to transmit, from the first UE to the second UE through a device-to-device communication, a first message comprising the MAC header and the MAC payload, wherein the first source identification field and the first target identification field are followed by the one or more MAC sub-headers,
   wherein the first source identification field is configured based on a source layer-2 identification of the first UE, the source layer-2 identification of the first UE being determined from a received proximity-based services identification associated with the first UE,
   wherein the first target identification field is configured based on a target layer-2 identification of the second UE, the target layer-2 identification of the second UE being determined from a received proximity-based services identification associated with the second UE,
   wherein the first target identification field has a length of 16 bits,
   wherein the first target identification field has a value of zero when a transmission type used for a MAC Packet Data Unit (PDU) is broadcasting, and
   wherein the first target identification field has a non-zero 16-bit value when a transmission type used for a MAC PDU is multicasting or unicasting.

6. The first UE of claim 5, wherein the receiver receives a second message transmitted from the second UE, wherein the second message comprising a MAC header comprising a second source identification field, a second target identification field, and one or more MAC sub-headers for a device-to-device communication, and
   wherein the second source identification field is associated with a source layer-2 identification of the second UE, and the second target identification field is associated with a target layer-2 identification of the first UE.

7. A source user equipment (UE) to perform a device-to-device communication in a wireless communication system, the source UE comprising:
   a receiver to receive a proximity-based services identification from a base station by a higher layer signaling;
   a processor to generate a medium access control (MAC) packet data unit (PDU) based on the received proximity-based services identification; and
   a transmitter to transmit the MAC PDU to one or more target UEs through a device-to-device communication,
   wherein for the generation of the MAC PDU the processor configures:
   a MAC header for the device-to-device communication, the MAC header comprising a source identification field and a target identification field following the source identification field, and
   a MAC payload for the device-to-device communication, the MAC payload comprising a MAC control element and a MAC service data unit,
   wherein the source identification field is associated with a source layer-2 identification corresponding to the source UE, and the target identification field is associated with a target layer-2 identification corresponding to the one or more target UEs,
   wherein the MAC control element comprises control information for the device-to-device communication, and the MAC service data unit comprises data to be transmitted through the device-to-device communication,
   wherein the target identification field has a length of 16 bits,
   wherein the target identification field has a value of zero when a transmission type used for a MAC PDU is broadcasting, and
   wherein the target identification field has a non-zero 16-bit value when a transmission type used for a MAC PDU is multicasting or unicasting.

8. The source UE of claim 7, wherein the source layer-2 identification is a multiple of 8 bits, and
   wherein the source layer-2 identification is longer than 8 bits and has a maximum length of 32 bits.

9. The source UE of claim 7, wherein at least one of the source layer-2 identification and the target layer-2 identification is determined from the proximity-based services identification, and
   wherein configuration information to determine an identification of a UE from the proximity-based services identification is included in a radio resource control (RRC) message transmitted from the base station.

10. A target user equipment (UE) to perform a device-to-device communication in a wireless communication system, the target UE comprising:
   a receiver to receive a medium access control (MAC) packet data unit (PDU) comprising a MAC header and a MAC payload, wherein the MAC header indicates a device-to-device communication, and the MAC payload comprises data to be transmitted through the device-to-device communication; and
   a processor to identify, from the MAC header, a source identification field and a target identification field following the source identification field, wherein the source identification field is associated with a source layer-2 identification of a source UE, and the target identification field is associated with a target layer-2 identification of the target UE, and to determine whether the MAC payload includes data for the target UE based on a value of the target identification field,
   wherein the target identification field has a length of 16 bits,
   wherein the target identification field has a value of zero when a transmission type used for a MAC PDU is broadcasting, and wherein the target identification field has a non-zero 16-bit value when a transmission type used for a MAC PDU is multicasting or unicasting.

11. The target UE of claim 10, wherein the receiver receives, from a base station, a radio resource control (RRC) message comprising a proximity-based services identification, and
the processor retrieves at least one of the source layer-2 identification and the target layer-2 identification based on the proximity-based services identification.

* * * * *